April 8, 1958        J. G. JARVIS        2,829,694
EXPENDABLE FORAGE CUTTING BLADE AND MOUNTING
Filed Nov. 16, 1955        2 Sheets-Sheet 1

Inventor
JAMES G. JARVIS
by: J. Richard Kavanagh

April 8, 1958      J. G. JARVIS      2,829,694
EXPENDABLE FORAGE CUTTING BLADE AND MOUNTING
Filed Nov. 16, 1955      2 Sheets-Sheet 2

Inventor
JAMES G. JARVIS

United States Patent Office 2,829,694
Patented Apr. 8, 1958

2,829,694

EXPENDABLE FORAGE CUTTING BLADE AND MOUNTING

James Gordon Jarvis, Meadowvale, Ontario, Canada, assignor to Grasslander Co. Limited, Milverton, Ontario, Canada Application November 16, 1955, Serial No. 547,210

5 Claims. (Cl. 146—121)

This invention relates to an expendable forage pressure cutting blade.

In the past, a straight knife edge has been pressed through straw resting upon a supporting surface. The pressure type cutting principle involved is not to be confused with that of a device somewhat similar in appearance but in which a shear knife is drawn past a ledger blade. Shear knife devices, by reason of their wedging action on a compacted mass of straw before the shearing takes effect upon the material being cut, requires the application of greater cutting effort.

Upon examining manual forage chopping devices of the last century, it will be noted that a shear knife could be sharpened without difficulty and even irregularly because the cutting edges of the shear knife and ledger blade were required only to pass one another under shearing action. By way of contrast, a pressure cutting device required that the cutting blade be sharpened to provide a cutting edge which along its full length would firmly engage the supporting surface against which the straw was cut.

Both of these cutting principles were adapted to rotary mechanism whereby the cutting blade was mounted for rotation about an axis. The pressure cutting rotary device for chopping forage material took the form of a cutting blade spaced from but aligned with the axis of rotation thereof and adapted to come into engagement with the surface of a co-operating drum which served as a supporting surface for the straw passing therebetween and against which the knife was adapted to press in the cutting action. While this device was suitable for operation under relatively light hand power, the full engagement of the cutting edge of the knife with the co-operating drum gave rise to vibration or jarring of the device at each engagement of the knife. Moreover, as the surface of the drum became worn, there was no provision for adjusting the blade for engagement therewith. Also, if the knife required resharpening, it was difficult to form an edge of sufficiently close tolerance to meet along its full length with the surfaces of the drum, particularly if the latter were slightly worn. The old forms of pressure cutting devices apparently fell into disuse in favour of more easily serviced and sharpened shear cutting devices though the latter required by their very nature of the principles of the cutting action involved, the application of a greater force to effect a cutting of a mass of straw or other forage material.

Present day attempts to provide power driven machinery for the cutting of hay, have adhered to the use of a shear cutting principle. With the advent of renewed interest in the direct feeding of livestock, it has become apparent that a shear cutting principle entails an onerous consumption of horsepower in conjunction with breaking up much of the material being cut into fine particles, breakage and bleeding of the material being cut and the formation of dust. Modern power machinery for cutting hay being limited by the use of a shear cutting principle and attended by a necessarily rougher handling of the material being cut, delivers an inferior product to that attained by the old manual methods and particularly by manually operated pressure cutting devices formerly used for cutting hay for feed purposes.

It is the particular object of the invention to provide a pressure type cutting blade which is expendable by reason of its cheapness and is economically replaceable without difficulty.

It is another object of the invention to provide a pressure cutting blade adapted for adjustment to compensate for wear in a co-operating pressure cutting supporting surface such as a drum or the functional equivalent thereof.

It is a further object of the present invention to provide a pressure cutting blade and means for mounting same whereby the blade may be positioned accurately by simple adjustment.

It is a still further object of the invention to provide a pressure type cutting blade for straw and the like including supporting means therefor adapted for cheap manufacture but embodying means for accurate adjustment thereof and wherein the blade is made of a light strip of suitable blade material adapted for production and sharpening by mass production means whereby the blade may be replaced at such low cost that the difficulties and nuisance of breakage and resharpening are substantially obviated.

With the foregoing and other objects in view, the invention will be appreciated in more detail by a study of the following specification taken in conjunction with the accompanying drawings.

Figure 1:
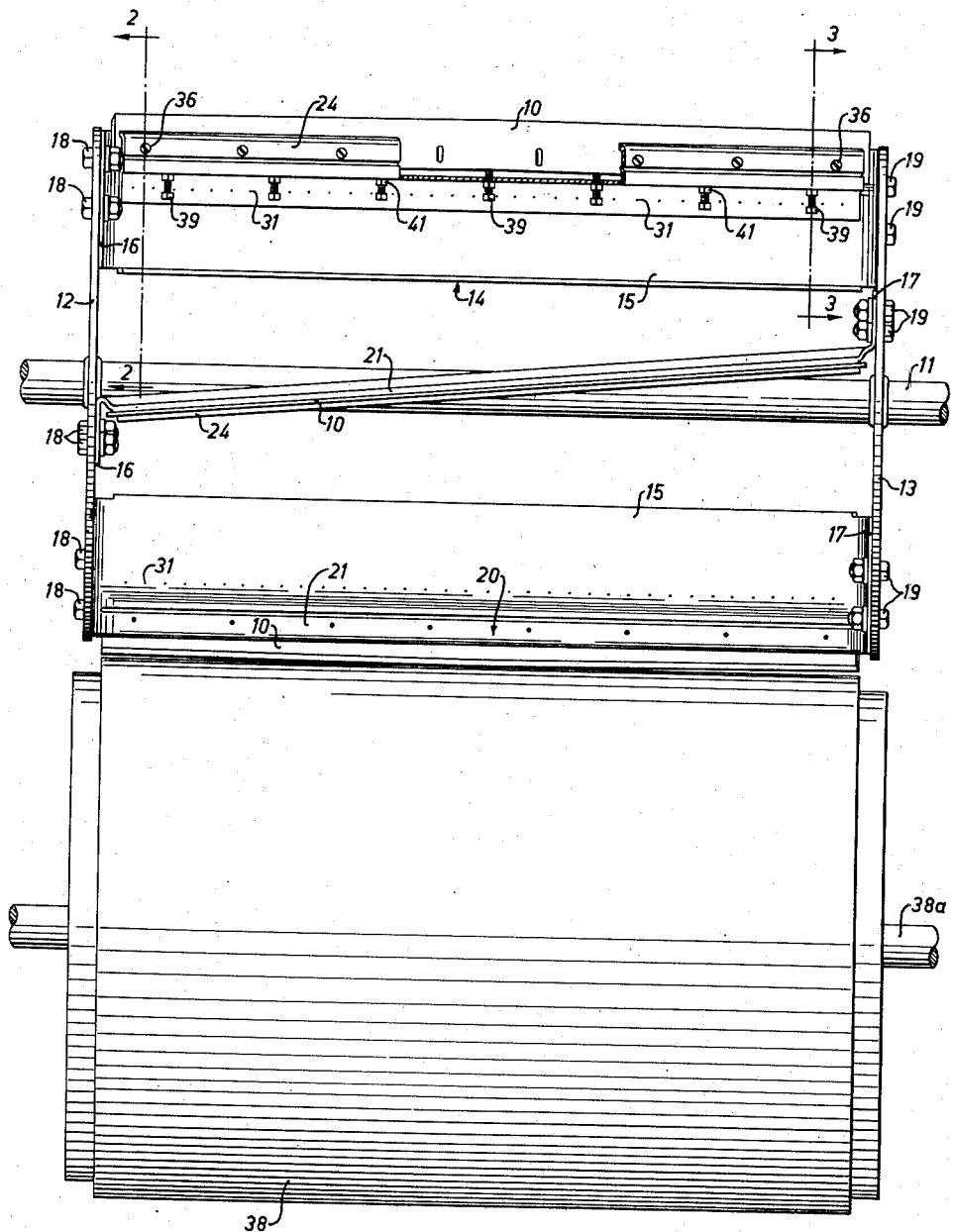
Figure 1 illustrates a form of pressure cutting device having an expendable cutting blade according to the invention and showing a co-operating supporting drum therefor by way of example.

Referring to Figure 1, expendable pressure cutting blade strips or blade members 10 formed of straight, flat, relatively thin metal such as shear steel, are shown mounted for rotation about the axis of rotatable shaft 11 by end supports shown by way of example in the form of spaced apart discs 12 and 13 having blade mounting assemblies 14 extending therebetween. Each blade mounting assembly embodies a bracket member 15 having oppositely directed flanges 16 and 17 at the ends thereof adapted to be fastened to discs 12 and 13 by means of radially spaced apart bolts 18 and 19.

Figure 2:
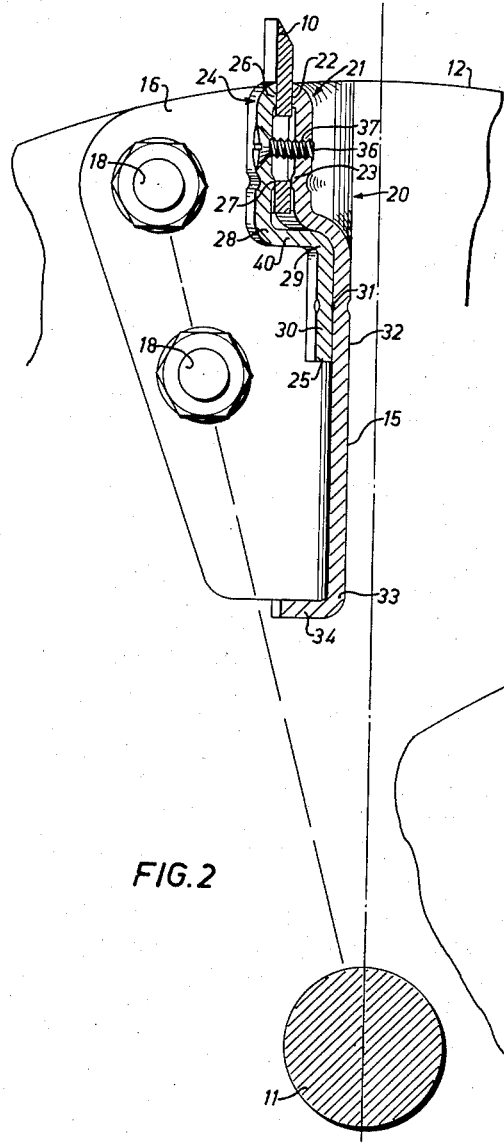
Figure 2 is an enlarged sectional view on the line 2—2 of Figure 1.
Figure 3:
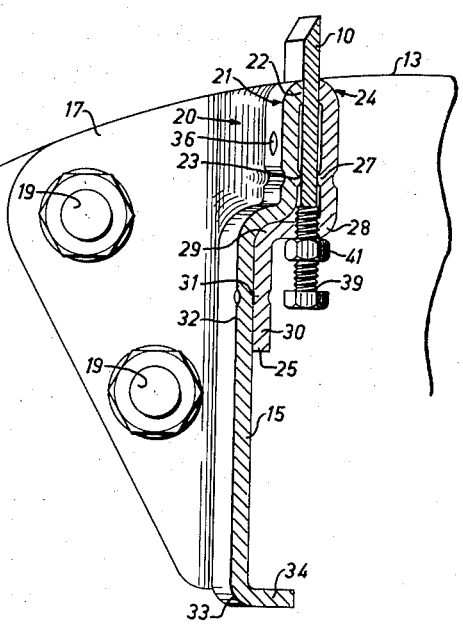
Figure 3 is an enlarged sectional view on the line 3—3 of Figure 1.

As is more clearly shown in Figures 2 and 3, the bracket 15 is preferably formed from a relatively heavy gauge piece of sheet metal, the ends of said piece being first turned to form the flanges 16 and 17 and thereafter the upper region 20 depressed such as by hot stamping methods to form one clamping jaw 21 having a clamping lip 22 and a clamping bead or shoulder 23 spaced therefrom and parallel thereto formed by a creasing or indenting operation. A co-operating or second clamping jaw 24 is formed from a separate strip of sheet metal 25 and embodies a similar clamping lip 26 and gripping shoulder or bead 27. In this case, however, the strip is bent or forged as at 28 and 29 to provide a supporting base or flange 30 adapted to be spot welded at a series of points 31 to the web portion 32 of the bracket 15. While it is preferred that the flange 30 of strip 25 be spot welded to the web 32, it may be fastened in any other suitable manner. The inner edge 33 of the web 31 is inturned to provide a flange 34 assisting in stiffening of the bracket.

Figure 4:
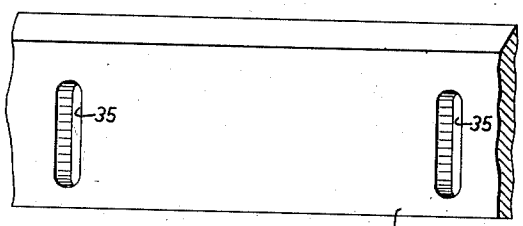
Figure 4 is an enlarged view of a portion of an expendable cutting blade according to the invention.

A pressure cutting blade 10 of the invention shown in more detail partially in Figure 4, is set between the clamping jaws 21 and 24. The mounting openings or slots 35 of the blade are aligned with the clamping screws 36 extending from one of the jaws through a blade slot 35 for threaded engagement as at 37 in the other clamping jaw. Referring also to Figure 1, a bracket carrying a cutting blade is brought into registry with the co-operating drum 38 on shaft 38a disposed in parallel spaced apart relation to shaft 11, in such manner that each end of the blade is first positioned for engagement with the surface of the drum and the endmost clamping screws 36 are tightened. The remaining clamping screws are left relatively loose until the cutting blade is adjusted along its length for engagement with the surface of the drum 38 by means of adjusting screws 39 threadably supported by the intermediate flange 40 of the clamping strip 25. Each adjusting screw 39 is turned to press the cutting blade outwardly to a desired position of adjustment after which the locking nut 41 is tightened. Thereafter, the untightened screws 36 may be turned for firm clamping of the blade 10 in the position of adjustment accomplished.

As shown in Figure 1, the brackets are formed to support the cutting blades in a longitudinal inclination of approximately five degrees. The blade remains flat and is not twisted and accordingly assuming that the drum 38 is truly cylindrical, it will be necessary to provide an outward curvature in the blade toward the central regions thereof. The adjustment described effects an outward curvature of the blade toward the mid-regions thereof for engagement with the surfaces of a truly cylindrical drum 38.

It will be apparent that in a construction wherein a pressure cutting blade is supported by a bracket of the invention in a position truly parallel in all respects to the axis of the supporting shaft 11, then the adjustment of the cutting blade described will serve to compensate for wear and distortions in the surfaces of the drum with which each blade comes into registry. The blade and supporting bracket construction of the invention enables the adjustment of the blade to compensate for peculiarities of construction encountered in providing a structure operating in accordance with pressure cutting principles and furthermore, compensates for prior disadvantages in such structures in respect to inefficiency of the cutting action due to wear of supporting surface for cutting, such as the drum surface and wear or damage to the edge of the cutting blade itself.

In this latter respect, the construction of the blade is of utmost importance in that the invention provides a cheap blade formed of a strip of suitable blade material having a series of equally spaced apart slots 35 extending the full length of the blade and which may be formed continuously in a simple manner by production methods and apparatus well known in the arts of fabricating industrial hacksaw blades and the like. Moreover, the cutting blades may be formed of special steels particularly adapted to the service intended.

A strip form of blade of a depth, i. e., strip width, up to about fifteen times the thickness thereof may be adjusted to an adjustment deflection of the order of one one-hundredth of its length without unduly stressing the cutting edge of the material of the blade. The strip blade width or depth should be less than about fifteen times the thickness and the length should be greater than about ten times the width so that an adjustment applying bending of the cutting edge outwardly to a medial deflection of about one one-hundredth of its length will occasion a maximum fibre stress in the cutting edge less than about fifteen hundred pounds per square inch in the shear steel.

The greater the longitudinal inclination of the blade, the greater deflection adjustment is required, to provide a cutting edge curvature to meet the surfaces of a cylindrical drum.

What I claim as my invention is:

1. An expendable pressure cutting blade adapted to be clamped in a position of outward curvature in a mounting for severing forage material such as straw and the like supported by a co-operating pressure cutting supporting surface and comprising in combination: a straight, flat, relatively thin flexible strip of cutting blade metal of a width less than about fifteen times the thickness thereof and of a length greater than about ten times the width; and a tensionable sharpened edge defining a straight pressure cutting edge along one edge of said strip.

2. In combination: a pressure cutting blade consisting of a relatively thin flat flexible strip of cutting blade material of substantial length as compared with its width and having a straight sharpened edge extending the full length thereof; a series of equally spaced openings extending the full length of said blade; a supporting bracket having a straight clamping jaw adapted to receive said cutting blade; a second jaw on said bracket co-operating with said first jaw in clamping said cutting blade; means acting between said jaws and passing through the openings in said blade for clamping said blade between said jaws; and means on one of said brackets engageable with said blade and adapted to provide an outward curvature on said cutting edge due to bending of said blade, the latter being maintained flat by said clamping jaws.

3. In combination: a pressure cutting blade consisting of a relatively thin flat flexible strip of cutting blade material of substantial length as compared with its width and having a straight sharpened edge extending the full length thereof; a series of equally spaced openings extending the full length of said blades; a supporting bracket having a straight clamping jaw adapted to receive said cutting blade; a second jaw on said bracket co-operating with said first jaw in clamping said cutting blade; means acting between said jaws and passing through the openings in said blade for clamping said blade between said jaws; means on one of said brackets engageable with said blade and adapted to provide an outward curvature on said cutting edge due to bending of said blade, the latter being maintained flat within said clamping jaws; and a pressure cutting supporting member having a pressure cutting supporting surface of substantially cylindrical form adapted for co-operation with said cutting edge in cutting material impinged therebetween.

4. In combination: a pressure cutting blade in the form of a relatively thin strip of cutting blade material of substantial length as compared with its width and having a tensionable straight sharpened edge extending the full length thereof; a series of equally spaced openings extending the full length of said blade; a supporting bracket having a clamping jaw adapted to receive said cutting blade; a second jaw on said bracket co-operating with said first jaw in clamping said cutting blade; means acting between said jaws and passing through the openings in said blade for clamping said blade between said jaws; a pressure cutting supporting member having a pressure cutting supporting surface adapted for co-operation with said cutting edge in cutting material impinged therebetween; and a series of adjusting means in said bracket adapted to engage said cutting blade for adjustment of the contour of the cutting edge thereof to tension the latter.

5. In combination: a pressure cutting blade in the form of a relatively thin strip of cutting blade material of substantial length as compared with its width and having a tensionable straight sharpened edge extending the full length thereof; a series of equally spaced openings extending the full length of said blade; a sheet metal stamping defining a supporting bracket having a clamping jaw adapted to receive said cutting blade; a second jaw on said bracket co-operating with said first jaw in clamping said cutting blade; means acting between said jaws and passing through the openings in said blade for clamping said blade between said jaws; a pressure cutting supporting member having a pressure cutting supporting surface of substantially cylindrical form adapted for co-operation with said cutting edge in cutting material impinged therebetween; and a series of adjusting means in said bracket adapted to engage said cutting blade for adjustment of the contour of the cutting edge therof to tension the latter and providing precise engagement of said cutting edge and said supporting surface.

References Cited in the file of this patent

UNITED STATES PATENTS

| | | |
|---|---|---|
| None | Greene | Aug. 8, 1833 |
| 61,933 | Gale | Feb. 12, 1867 |
| 505,189 | Climer | Sept. 19, 1893 |
| 1,786,726 | Absmeier | Dec. 30, 1930 |
| 2,399,526 | Willits | Apr. 30, 1946 |
| 2,735,469 | West | Feb. 21, 1956 |

FOREIGN PATENTS

| | | |
|---|---|---|
| 22,978 | Finland | Jan. 27, 1949 |

UNITED STATES PATENT OFFICE

Certificate of Correction

Patent No. 2,829,694 April 8, 1958

James Gordon Jarvis

It is hereby certified that error appears in the above numbered patent requiring correction and that the said Letters Patent should read as corrected below.

In the grant, lines 2 and 3, for "assignor to Grasslander Co. Limited, of Milverton, Ontario, Canada," read —assignor, by mesne assignments, to Grasslander (1957) Limited, of Milverton, Ontario, Canada,—; line 12, for "Grasslander Co. Limited, its successors" read —Grasslander (1957) Limited, its successors—; in the heading to the printed specification, lines 4 to 6, for "assignor to Grasslander Co. Limited, Milverton, Ontario, Canada" read —assignor, by mesne assignments, to Grasslander (1957) Limited, Milverton, Ontario, Canada—.

Signed and sealed this 18th day of November 1958.

[SEAL]

Attest:
KARL H. AXLINE,
*Attesting Officer.*

ROBERT C. WATSON,
*Commissioner of Patents.*